Nov. 22, 1932.  E. F. BEGTRUP  1,888,815
METHOD AND APPARATUS FOR PRESSURE BUTT WELDING TUBES AND THE LIKE
Filed Dec. 23, 1930
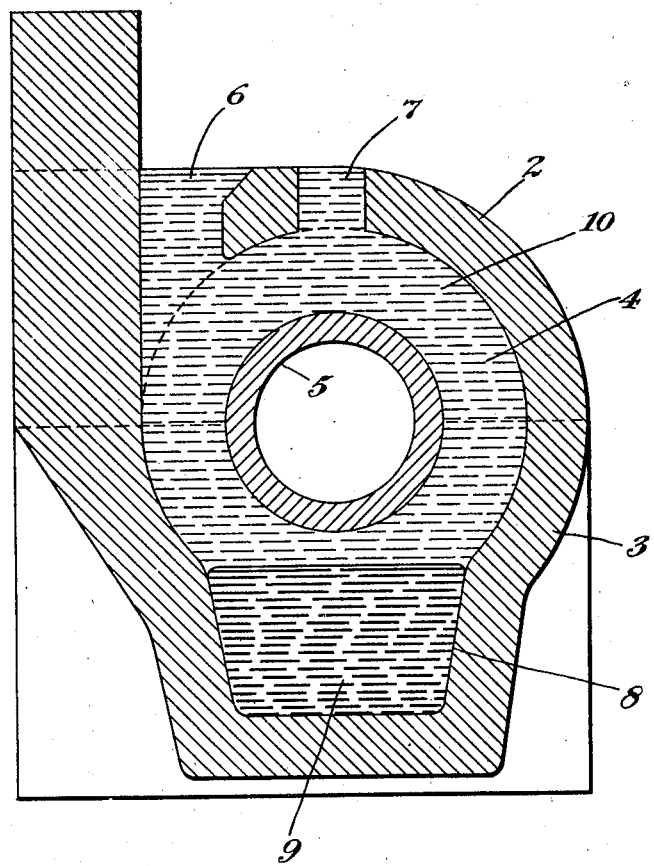
Inventor
Edward F. Begtrup
By his Attorney Patented Nov. 22, 1932

1,888,815

UNITED STATES PATENT OFFICE

EDWARD F. BEGTRUP, OF JERSEY CITY, NEW JERSEY

METHOD AND APPARATUS FOR PRESSURE BUTT-WELDING TUBES AND THE LIKE

Application filed December 23, 1930. Serial No. 504,254.

The invention relates to certain improvements in the pressure butt welding of tubes, bars and similar metal bodies by means of the superheated products of the alumino-thermic reaction, as more particularly pointed out in the following specification, predicated on the accompanying drawing which is a sectional elevation of a mold of novel form for carrying out the invention.
In making alumino-thermic pressure butt welds between the ends of tubes, pipes, bars or similar metal bodies, the general practice has been to dress the ends of the bodies flat and square, abut the ends by means of suitable clamps, and surround the abutted ends by a split mold, usually of cast iron, within which mold there is provided an annular space which completely surrounds the outer peripheries of the ends of the bodies to be welded. The mold is provided with a perpendicular pouring gate substantially tangent to the annular mold cavity into which the alumino-thermic reaction products, consisting of superheated slag and metal, are poured, the pouring being effected by decanting the molten mass from the top of the crucible, in order that the slag may enter the mold first and be followed by the metal. After the mold has been filled with the superheated reaction products, there is a transference of heat units from said products to the ends of the tubes, bars or other bodies to be welded, which quickly brings these ends to a temperature sufficient to effect butt welding of the bodies, which is then brought about by forcing or pressing the bodies together mechanically. The annular space within the mold surrounding the ends of the bodies is usually made of such dimensions and capacity that, when it is completely filled with the superheated slag and metal, there will be just sufficient heat units available for transfer to the ends of the bodies to be welded to bring the said ends to butt welding temperature.
The alumino-thermic mixture generally employed in this method of welding produces, upon reaction, approximately one-half of its weight in metal and one-half of its weight in alumina slag, which translated into volume is one-third metal and two-thirds slag. When these products of the reaction are poured into the mold, the slag enters first and the metal follows and the latter being of higher specific gravity finds its level in the bottom of the annular mold space with the slag filling the upper portion of the mold cavity or space. When the charge is just sufficient to fill the mold cavity, the metal occupies the lower third thereof and the slag the upper two-thirds. By this construction and disposition of the mold and the bodies to be welded, it was found that those portions of the said bodies adjacent the body of metal in the bottom of the mold did not become as hot as those portions of the bodies surrounded by the slag and it was also noted that the portions of the bodies adjacent the metal, upon completion of the weld, had a more pronounced outward bulge than the parts surrounded by the slag, a condition particularly objectionable in case of pipes or tubes. Furthermore, it was found impossible to successfully weld thin walled tubes and certain alloy tubes, both ferrous and non-ferrous, by this method.

These difficulties and objections have been completely overcome by the present invention, so that practically perfect welds may be effected between bodies of the character indicated. The fundamental principle upon which the invention is based is to effect heating of the ends of the bodies to be welded by contact with the superheated slag within the mold cavity, which slag is so disposed in the cavity as to completely surround the enclosed ends of the bodies. This result is preferably effected by means of a mold of the type illustrated in the drawing, in which 2 is the upper section of the mold, 3 the lower section thereof, 4 the annular space or mold cavity which surrounds the ends of the tubes or similar bodies 5 to be welded, which ends are enclosed within the mold. The upper mold section is provided with the usual pouring gate 6 and vent 7. The mold cavity in the bottom section of the mold is extended downwardly to provide a recess, well or sump 8 of sufficient capacity to receive the metal constituent of the reaction products indicated at 9, so that the superheated metal will collect in this recess or well, leaving the ends of the bodies to be welded completely surrounded by the superheated slag 10. With this distribution of the alumino-thermic products, perfect uniformity of welds can be had between the ends of the tubes or other bodies with no disproportionate bulge at any point in the peripheries thereof. By this practice, thin walled tubing, as well as alloy tubes, both ferrous and non-ferrous, may be successfully butt welded.

This method of butt welding is of especial advantage, because of the fact that the alumina slag solidifies at a very high temperature and has a very low coefficient of expansion, so that, when the slag completely surrounds the enclosed ends of the bodies to be welded, it is effective in supporting and maintaining the symmetry of the bodies, especially tubes, which must be heated to substantially melting temperatures to effect the welding thereof.

As stated, the invention is especially efficacious in making butt welds between thin walled tubes and various alloy tubes, which could not be butt welded by the alumino-thermic method as heretofore practiced.

What I claim is:

1. The method of butt-pressure welding tubes, bars and like metal bodies, which comprises enclosing the ends of the bodies in abutting relation in a mold, filling the mold cavity about said ends and completely surrounding said ends solely with the mass of superheated slag from an alumino-thermic reaction, while keeping the metal of the reaction away from and at one side of said bodies and pressing the ends of the bodies together.

2. The method of butt-pressure welding tubes, bars and like metal bodies, which comprises enclosing the ends of the bodies in abutting relation in a mold, filling the mold cavity about said ends and completely surrounding said ends solely with the mass of superheated slag from an alumino-thermic reaction, collecting the metal of said reaction in a separate section of the mold away from and at one side of said bodies to avoid contact between said metal and the bodies, and pressing the ends of the bodies together.

In testimony whereof I affix my signature.

EDWARD F. BEGTRUP.